United States Patent

Gordon

[11] Patent Number: 5,772,246
[45] Date of Patent: Jun. 30, 1998

[54] MECHANICAL SHOCK REDUCTION IN PRETENSIONERS

[75] Inventor: Ian Gordon, Carlisle, United Kingdom

[73] Assignee: AlliedSignal Ltd., Carlisle Cumbria, England

[21] Appl. No.: 683,398

[22] Filed: Jul. 18, 1996

[30] Foreign Application Priority Data

Jul. 20, 1995 [GB] United Kingdom .................. 9514938

[51] Int. Cl.[6] .................................................. B60A 22/36
[52] U.S. Cl. ............................................................. 280/806
[58] Field of Search ............................................. 280/806

[56] References Cited

U.S. PATENT DOCUMENTS 5,284,307  2/1994  Kotama ................................. 280/806
5,364,129  11/1994  Collins et al. ........................ 280/806

*Primary Examiner*—Kenneth R. Rice
*Attorney, Agent, or Firm*—Markell Seitzman

[57] ABSTRACT

A pretensioner for a vehicle safety restraint comprises a cylindrical hollow tube, a piston member located within the tube and connected via a cable to a part of the vehicle safety restraint, and a pyrotechnic charge which is activated in the event of a collision to evolve a volume of gas within the tube to move the piston from one end of the tube to the other, wherein a pressure relief port is provided in the tube at a point along its length which is close to the end of the tube toward which the piston is moved on activation of the pyrotechnic charge.

9 Claims, 3 Drawing Sheets

_5,772,246_

MECHANICAL SHOCK REDUCTION IN PRETENSIONERS

BACKGROUND AND SUMMARY OF THE INVENTION

The present invention relates to a pretensioner for a vehicle safety restraint and particularly to a so-called pyrotechnic pretensioner in which the ignition of a pyrotechnic charge involves a volume of gas which under pressure retracts a cable to either pull back a buckle fastening or rewind a retractor spool in a three point safety belt arrangement. This occurs on actuation of a collision sensor and has the effect of taking any slack out of the safety belt so as to more safely position and more securely restrain a vehicle occupant in a crash situation.

Typically such a pyrotechnic pretensioner comprises a piston slidably mounted within a cylindrical guide tube. The piston is connected to a part of the safety restraint mechanism by means of a cable. One end of the tube is closed by an end assembly (which may consist of several components) and the other end is typically open to atmosphere. Some models do provide a cover or bung in the open end to prevent ingress of dirt and foreign bodies into the tube, but these do not have a significant effect on the gas pressure at the open end of the tube. The pretensioner is powered by a small pyrotechnic charge which can be housed either in the end assembly or in the piston itself. Normally the piston is situated at the end of the tube nearest to the end assembly. When conditions indicative of a crash are sensed (for example acceleration or deceleration exceeding a predetermined level) then the pyrotechnic charge is ignited. The gas evolved pressurizes the space in the tube between the end assembly and the piston, with the result that the piston is pushed towards the open end of the tube. This in turn pulls on the cable and tightens the vehicle safety restraint around the wearer. At the end of the piston stroke a lock may come into play to prevent the piston moving back down the tube.

It is necessary to retard the piston towards the end of the stroke in order to reduce the shock loading on the retractor or buckle, and also to reduce the possibility of the piston (or parts of it) being expelled from the tube. This can arise if the cable fails and could be highly dangerous.

In some models the piston is retarded by relying on deformation of the tube and piston to absorb the gas pressure forces within the tube. The drawback with this is that deformation of the tube is only allowed to take place over a relatively short distance and the effects are highly unpredictable. According to how much slack is initially present in the webbing the piston may have a very large or a very small velocity as it strikes the formed end of the tube. If the piston deforms too much it may be able to pass out of the tube. In any case, the gas pressure is still acting on the piston as it strikes the formed end of the tube. Alternatively, the gas pressure forces within the tube may be absorbed by impact of that part of the vehicle safety restraint, typically the buckle, connected to the cable with the end assembly. The drawback with this is that using the buckle striking the end assembly as a stop may cause the buckle to unlatch due to the inertia of the release button on the buckle.

It is an object of the present invention to provide a pretensioner in which the problems and drawbacks referred to above are obviated or at least substantially mitigated.

According to the present invention there is provided a pretensioner for a vehicle safety restraint comprising a cylindrical hollow tube, a piston member located within the tube and connected via a cable to a part of the vehicle safety restraint, and a pyrotechnic charge which is activated in the event of a collision to evolve a volume of gas within the tube to move the piston from one end of the tube to the other, wherein a pressure relief port is provided in the tube at a point along its length which is close to the end of the tube toward which the piston is moved on activation of the pyrotechnic charge.

The position of the pressure relief port in the tube is such that it vents to atmosphere the high pressure gas driving the piston when or slightly before the piston reaches the end of the tube. In this way, the formed end of the tube is only required to absorb the kinetic energy of the piston and cable. The port may take any of a variety of forms to produce different characteristics of gas flow.

In a preferred embodiment of the invention the end of the tube toward which the piston is driven is closed. As the piston moves towards the closed end of the tube air is displaced through the port and there is no significant increase in pressure ahead of the piston. However, the moment the piston passes the port the space at the closed end of the tube is sealed off from atmosphere. Further travel of the piston compresses the air trapped in this enclosed space, thus cushioning further forward movement of the piston. The high pressure gas driving the piston forward is of course vented to atmosphere, as soon as the piston passes beyond the port.

Operation of the pretensioner may be further improved by providing an axially extending channel in the inner wall of the tube opposite the port. The axial length of the channel is greater than that of the piston, which in turn is greater than that of the port. As the piston moves towards the closed end of the tube air is displaced through the port to atmosphere. However, in this arrangement when the piston passes over the port and closes it off the space at the closed end of the tube is not sealed off. It is in fact connected to the space behind the piston via the axial channel. Consequently, there is an equalization of pressure across the piston. The sudden increase in pressure ahead of the piston results in much more rapid retraction of the piston than is the case when relying solely upon the inertia of the piston to pressurize the air from atmosphere.

BRIEF DESCRIPTION OF THE DRAWINGS

For a better understanding of the invention and to show how the same might be carried into effect, reference will now be made to the accompanying drawings in which.

DETAILED DESCRIPTION OF THE DRAWINGS

Figure 1:
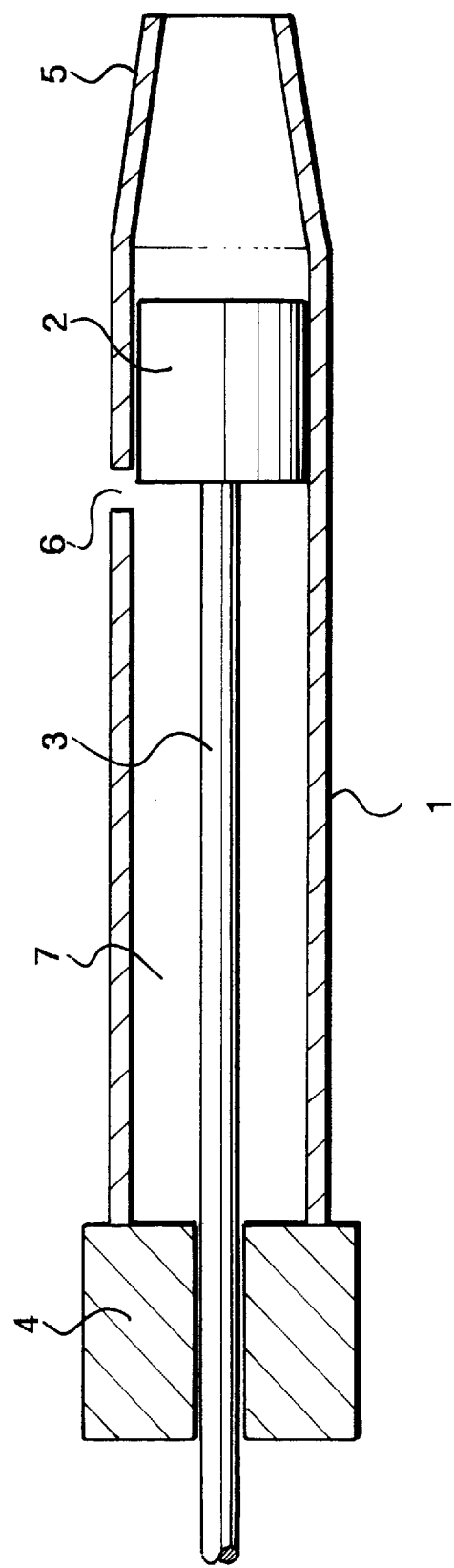
FIG. 1 is a schematic view in section of a pretensioner according to one embodiment of the present invention.

Referring to FIG. 1 the pretensioner illustrated consists of a guide tube 1 and a piston 2 which is slidable within the tube 1 from one end to the other. The piston 2 combines a pyrotechnic charge, now shown separately, and is attached to a cable 3 which passes out of the tube 1 through a seal arrangement 4 mounted on one end of the tube 1. In conventional manner the cable is connected to a buckle fastening or a retractor spool in a vehicle safety restraint. The other end of the tube 1 is open to atmosphere, but defines a formed portion 5, the purpose of which is to retain the piston 2 with the tube 1. A pressure relief port 6 is provided in the side of the tube close to the formed end 5 of the tube 1.

As shown in FIG. 1 the pretensioner has already been activated; prior to activation the piston 2 would be positioned in the end of the tube 1 towards the seal arrangement 4.

The pretensioner is activated in the event of a crash by an electrical pulse from a collision sensor, not shown, the electrical pulse ignites the pyrotechnic charge in the piston 2 which then rapidly releases a volume of gas into the space 7 between the seal arrangement 4 and the piston 2. The rapid increase in pressure behind the piston 2 propels it along the tube 1 towards the formed end 5, retracting the cable 3 and that part of the vehicle safety restraint to which it is attached.

As soon as the piston 2 passes beyond the port 6, the high pressure gas in the space 7 is vented to atmosphere and the pressure differential across the piston 2 falls immediately to zero. In this way the formed end 5 of the tube 1 has only to absorb the kinetic energy of the piston 2 and cable 3 to retard the piston. This considerably minimizes the shock loading exerted on the vehicle safety restraint and eliminates the possibility of the piston being propelled out of the tube.

Figure 2:
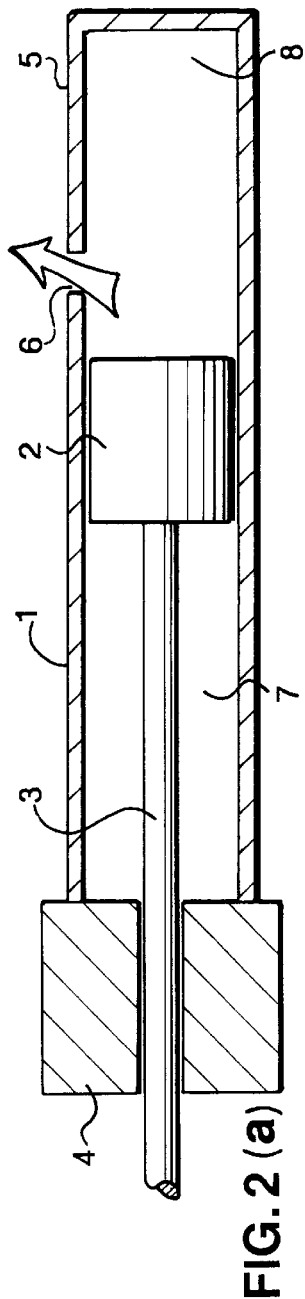
FIGS. 2(*a*) to (*c*) show a sequence of schematic views in section of a pretensioner according to another embodiment of the present invention in operation.
Figure 2:
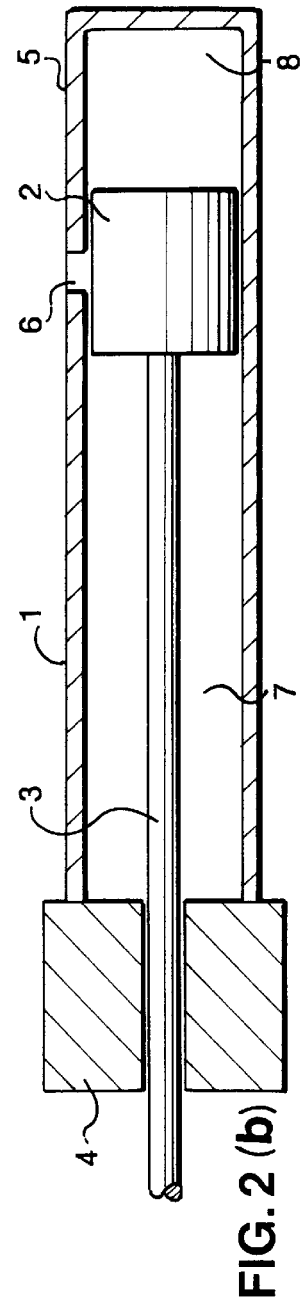
Figure 2:
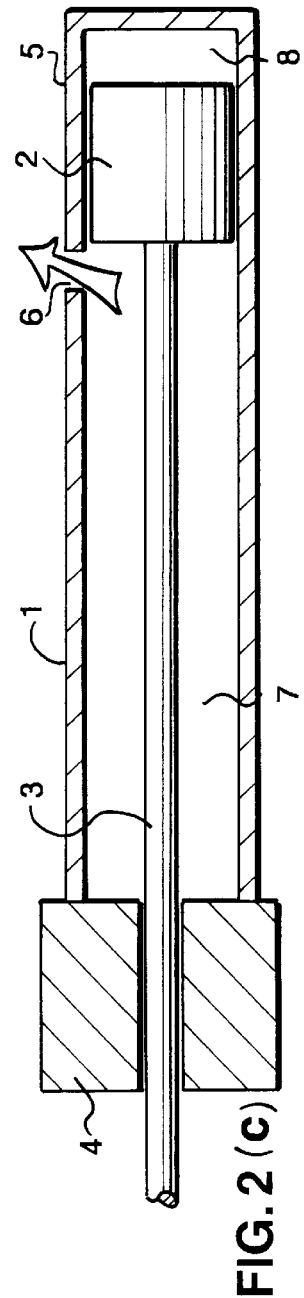

In another embodiment of the pretensioner according to the present invention shown in FIGS. 2 (a) to (c) the end 5 of the tube 1 towards which the piston 2 is propelled is sealed.

Operation of the pretensioner is as described for the pretensioner of FIG. 1. However, as the piston 2 travels towards the closed end 5 of the tube 1 air in the space 8 ahead of it is displaced through the port 6. Initially, as shown in FIG. 2(a), there is no increase in pressure in the space 8, but immediately the piston 2 passes over the port 6, as shown in FIG. 2(b) the space 8 is sealed off from atmosphere. As the piston continues its forward travel the air in the space 8 is compressed. This, of course, cushions the piston 2. Finally, the piston 2 passes beyond the port 6, as shown in FIG. 2(c) allowing the pressurized gas in the space 7 behind the piston 2 to escape to atmosphere. This arrangement allows the piston 2 to be retarded with minimal, if any, risk of deforming or damaging the tube 1.

Figure 3A:
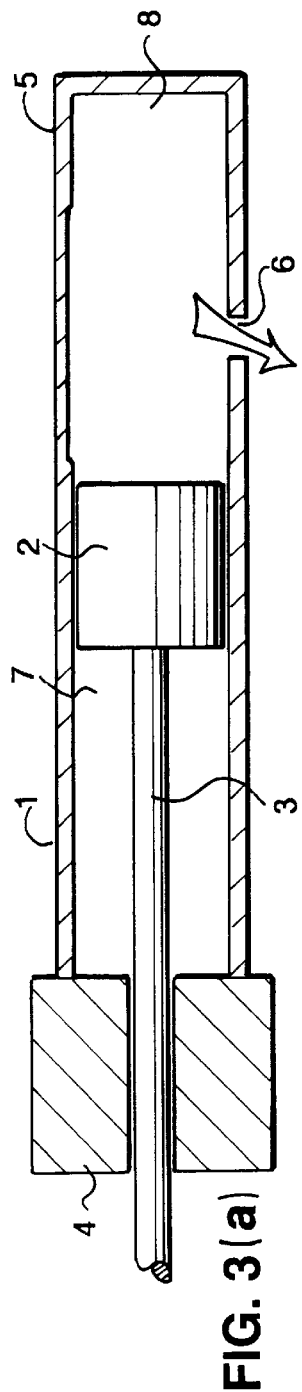
FIGS. 3(*a*) to (*c*) show a sequence of schematic views of a modified version of the pretensioner of FIGS. 2(*a*) to (*c*) also in operation.
Figure 3B:
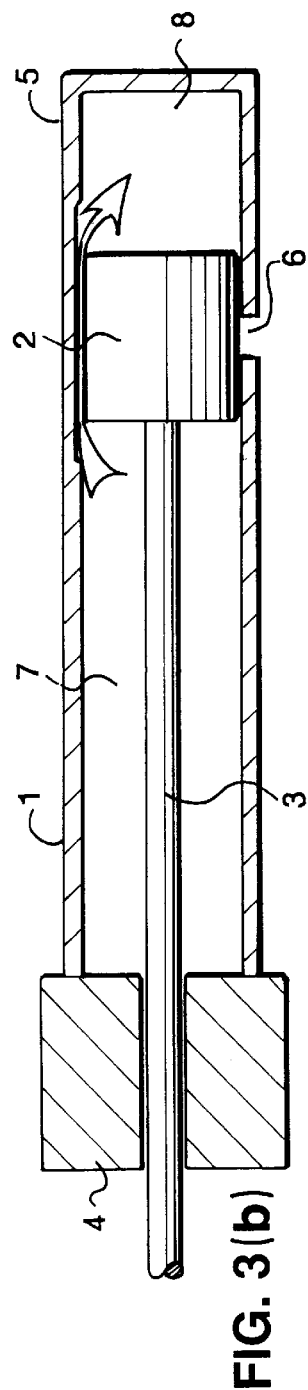
Figure 3C:
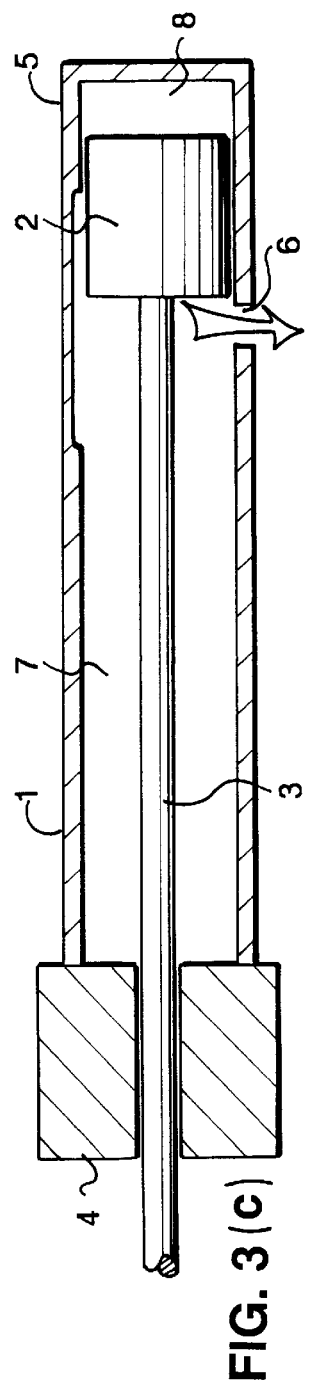

The pretensioner shown in FIGS. 3(a) to (c) is a modified version of the one shown in FIGS. 2(a) to (c). In this arrangement an axially extending channel 9 is formed in the inner wall of the tube 1 opposite the port 6. The length of the axial channel 9 is greater than that of the piston 2 and it begins at a point in front of the port 6 and finishes at a point beyond it.

As in the pretensioner of FIGS. 2(a) to (c) when the pretensioner is initially activated, as shown in FIG. 3(a), air in the space 8 in front of the piston 2 is displaced through the port 6. However, once the piston 2 reaches a point, as shown in FIG. 3(b), between the leading and lagging ends of the axial channel 9, at which the port 6 is closed by the side walls of the piston 2, high pressure gas passes into the space 8 from the space 7 via the axial channel 9, thus equalizing the pressure across the piston 2. As the piston 2 continues to travel forward it does so against the high pressure gas within the space 8 which, of course, provides much more effective retardation of the piston than is the case in the arrangement of FIGS. 2(a) to (c) where air initially at atmospheric pressure is being compressed.

To further enhance the retardation effect of the high pressure gas in the space 8 on the piston 2, the end of the axial channel 9, can be so positioned as to ensure that the front face of the piston 2 passes beyond it, thereby sealing the space 8 in the end of the guide tube 3, before the rear face of the piston 2 passes the forward edge of the port 6. This ensures that the connection between the spaces 7 and 8 is interrupted before the port 6 is opened to allow the high pressure gas driving the piston 2 forward to escape to atmosphere.

What we claim is:

1. A pretensioner for a vehicle safety restraint comprising
   a cylindrical hollow tube having a first and a second, opposing, end;
   a piston member located within the tube;
   a cable connected between said piston member and a part of the vehicle safety restraint; and
   a pyrotechnic charge which is activated in the event of a collision to evolve a volume of gas within said tube to move said piston from the first end of said tube toward the second end;
   a pressure relief port provided in said tube at a point along the tube's length which point is close to the second end of the tube, toward which the piston is moved on activation of the pyrotechnic charge;
   wherein the position of the pressure relief port in the tube is such that it vents to atmosphere the high pressure gas driving the piston when or slightly before the piston reaches the second end of the tube; and further comprising an axially extending channel in the inner wall of the tube opposite the port.

2. A pretensioner for a vehicle safety restraint according to claim 1, wherein said channel has an axial length which is greater than that of said piston.

3. A pretensioner for a vehicle safety restraint according to claim 1, wherein the second end of the tube, toward which the piston is driven, is closed.

4. A pretensioner for a vehicle safety restraint comprising
   a cylindrical hollow tube having a first and a second, opposing, end;
   a piston member located within the tube;
   a cable connected between said piston member and a part of the vehicle safety restraint; and
   a pyrotechnic charge which is activated in the event of a collision to evolve a volume of gas within said tube to move said piston from the first end of said tube toward the second end;
   a pressure relief port provided in said tube at a point along the tube's length which point is close to the second end of the tube, toward which the piston is moved on activation of the pyrotechnic charge; and an axially extending channel in the inner wall of the tube opposite the port.

5. A pretensioner for a vehicle safety restraint according to claim 4, wherein said channel has an axial length which is greater than that of said piston.

6. A pretensioner for a vehicle safety restraint according to claim 5, wherein said piston has an axial length which is greater than that of said port.

7. A pretensioner for a vehicle safety restraint according to claim 4, wherein the second end of the tube, toward which the piston is driven, is closed.

8. A pretensioner for a vehicle safety restraint, comprising
   a cylindrical hollow tube having a first and a second, opposing, end;
   a piston member located within the tube;
   a cable connected between said piston member and a part of the vehicle safety restraint; and a pyrotechnic charge which is activated in the event of a collision to evolve a volume of gas within said tube to move said piston from the first end of said tube to the second end;

a pressure relief port provided in said tube at a point along the tube's length which point is close to the second end of the tube, toward which the piston is moved on activation of the pyrotechnic charge, wherein the position of the pressure relief port in the tube is such that it vents to atmosphere the high pressure gas driving the piston when or slightly before the piston reaches the second end of the tube, the pretensioner further comprising an axially extending channel in the inner wall of the tube opposite the port.

wherein said piston has an axial length which is greater than that of said port.

9. A pretensioner for a vehicle safety restraint according to claim 8 comprising an axially extending channel in the inner wall of the tube opposite the port.

* * * * *